United States Patent [19]
Chang et al.

[11] Patent Number: 5,611,004
[45] Date of Patent: Mar. 11, 1997

[54] MICROPHOTONIC POLARIZATION INDEPENDENT ACOUSTO OPTICAL TUNABLE FILTER AND RECEIVER

[75] Inventors: Kok-Wai Chang, Sunnyvale; Lewis B. Aronson, Los Altos, both of Calif.

[73] Assignee: Hewlett-Packard Company, Palo Alto, Calif.

[21] Appl. No.: 594,074

[22] Filed: Jan. 30, 1996

[51] Int. Cl.$^6$ .................................................. G02B 6/00
[52] U.S. Cl. ................................................................ 385/11
[58] Field of Search ..................... 385/1, 4, 11; 359/189, 359/192, 285, 308, 313, 314; 356/300; 250/338.5, 339.12, 339.13, 343

[56] References Cited

U.S. PATENT DOCUMENTS

| | | | |
|---|---|---|---|
| 3,817,598 | 6/1974 | Taylor | 359/308 |
| 4,052,121 | 10/1977 | Chang | 359/314 |
| 4,490,845 | 12/1984 | Steinbruegge et al. | 250/338.5 |
| 4,637,689 | 1/1987 | Chang | 359/308 |
| 5,002,349 | 3/1991 | Cheung et al. | 385/1 |
| 5,159,481 | 10/1992 | Maeda | 359/189 |
| 5,230,005 | 7/1993 | Rubino et al. | 372/20 |

OTHER PUBLICATIONS

D. A. Smith, J. E. Baran, K. W. Cheung, and J. J. Johnson, "Polarization–Independent Acoustically Tunable Optical Filter", Applied Physics Letters, vol. 56, No. 3, Jan. 15, 1990, pp. 209–211.

*Primary Examiner*—Akm E. Ullah

[57] ABSTRACT

A polarization independent acousto-optical tunable filter (AOTF). The AOTF is fabricate with two waveguides formed on a single substrate. An incoming polarization independent beam of light is split into TE and TM optical components with a walk-off crystal wherein each optical component is coupled into a different one of the two waveguides. The AOTF can be formed to provide two stages of filtering. The two stages of filtering can be realized be providing two successive stages or by passing the optical signal through the same filter twice. Various configurations are obtained by placing TM and TE polarizers within the optical path traveled by the incoming beam of light.

7 Claims, 8 Drawing Sheets

MICROPHOTONIC POLARIZATION INDEPENDENT ACOUSTO OPTICAL TUNABLE FILTER AND RECEIVER

FIELD OF INVENTION

This invention relates generally to optical filters. In particular, it relates to polarization independent acoustic-optical filters.

BACKGROUND

An acousto-optic filter ("AOTF") is an electronically tunable optical bandpass filter. Electronically tunable optical filters have been constructed so that an incident light beam of a first polarization is diffracted by an acoustic wave in a birefringent crystal to shift from the first polarization to a second polarization of the light beam for a selected bandpass of optical frequencies. The center wavelength of the passband of this type of filter is electronically tunable by changing the frequency of the acoustic wave within the crystal. Bulk AOTF's fabricated in bulk crystals and using bulk acoustic waves and unguided optical beams have already found many important applications in laser and optics systems. Integrated AOTFs in which light is confined to a waveguide and which use surface acoustic waves are also expected to find important applications in laser and fiber optics systems, especially such as are used in modern telecommunications applications.

Figure 1:
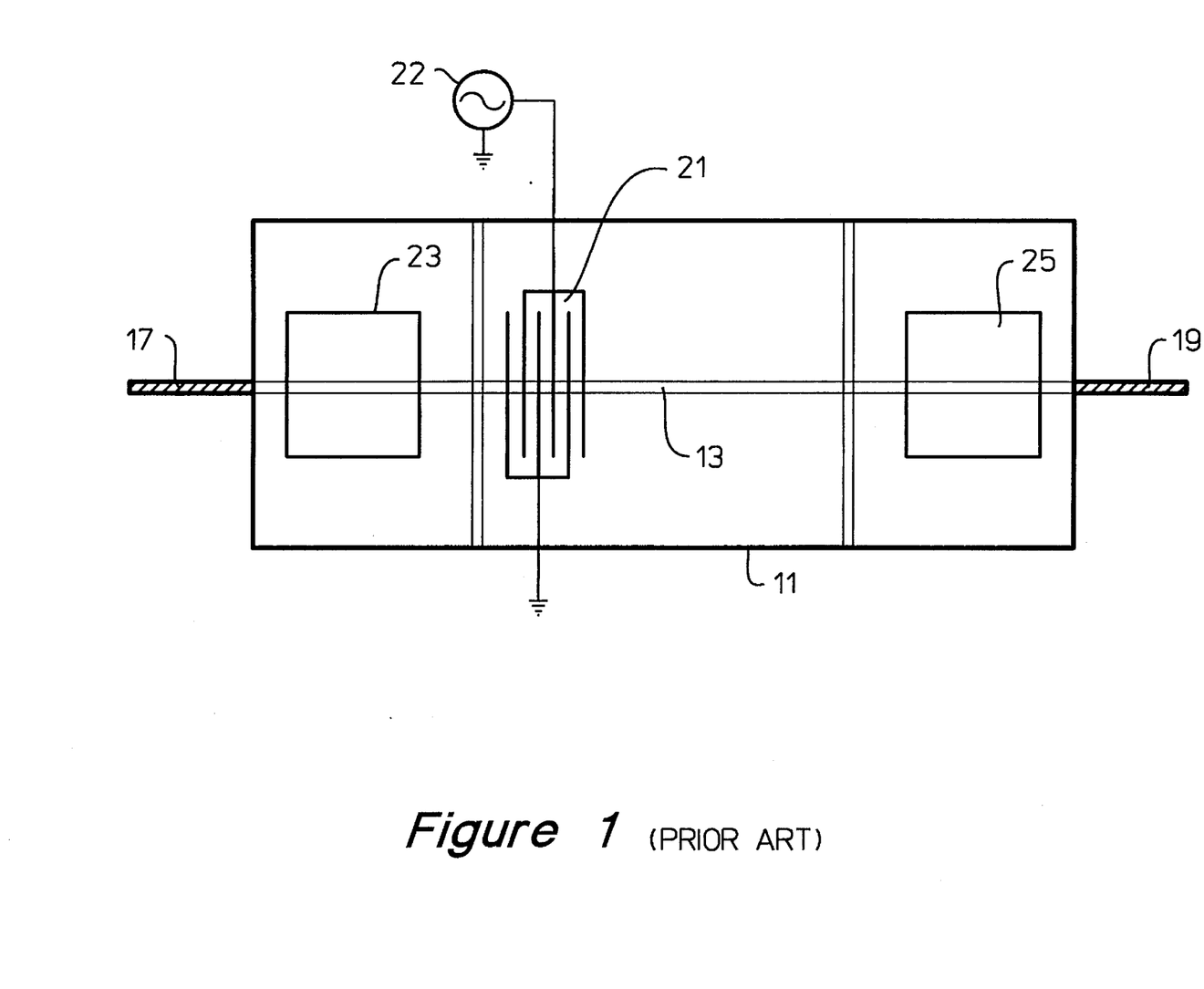
FIG. 1 shows a prior art AOTF.

As shown in FIG. 1, an integrated AOTF is fabricated in an elongated crystalline substrate 11 such as lithium niobate ($LiNbO_3$). An optical waveguide 13 is formed in an upper surface of the substrate, for example by indiffusion of titanium. A beam of light is coupled into the waveguide 13 through an input optical fiber 17. The light propagates through the waveguide and out through an output optical fiber 19. A surface acoustic wave is induced in the waveguide by an interdigitated transducer 21. The transducer is driven by an externally-generated electrical signal from a signal source 22. The frequency of the acoustic wave is determined by the frequency of the electrical signal.

The acoustic wave induces a diffraction grating in the waveguide. The grating couples the transverse electric (TE) and transverse magnetic (TM) polarization modes of the light, but only within a narrow band of optical wavelengths. Thus, within this narrow band all the light propagating in one polarization mode is converted to the orthogonal mode, whereas outside this band the polarization mode of the light is unaffected A TE pass polarizer 23 adjacent the first extremity of the waveguide blocks any incoming light that is not in a first polarization mode. Thus, only light polarized in the first mode is admitted to the filter. As the light travels through the waveguide, the polarization mode of any of the light having a wavelength within the narrow band of optical wavelengths is converted to a second mode which is orthogonal to the first mode. The polarization of the rest of the light is unaffected. A TM pass polarizer 25 opposite the polarizer 23 blocks from the output any light that is not in the second polarization mode. Thus, only light having a polarization mode that has been converted while passing through the filter is allowed to exit the filter. No output destination is shown, but it will be understood that the output light is ultimately provided to a user or to an optical device of some type.

The AOTF passes light having a wavelength within the band determined by the acoustic wave and blocks other light. Thus the AOTF serves as a bandpass filter. The center frequency of the pass band can be tuned by changing the frequency of the electrical signal that drives the transducer. The filter can be converted into a "notch" filter by changing the polarizer 25 to the same type of polarizer as the polarizer 23.

As light passes through the waveguide and is diffracted by the acoustic wave, the frequency of the light is Doppler-shifted because the grating induced by the acoustic wave is in motion with respect to the waveguide. If desired, this Doppler shift can be canceled by passing the light through a second AOTF.

Figure 2:
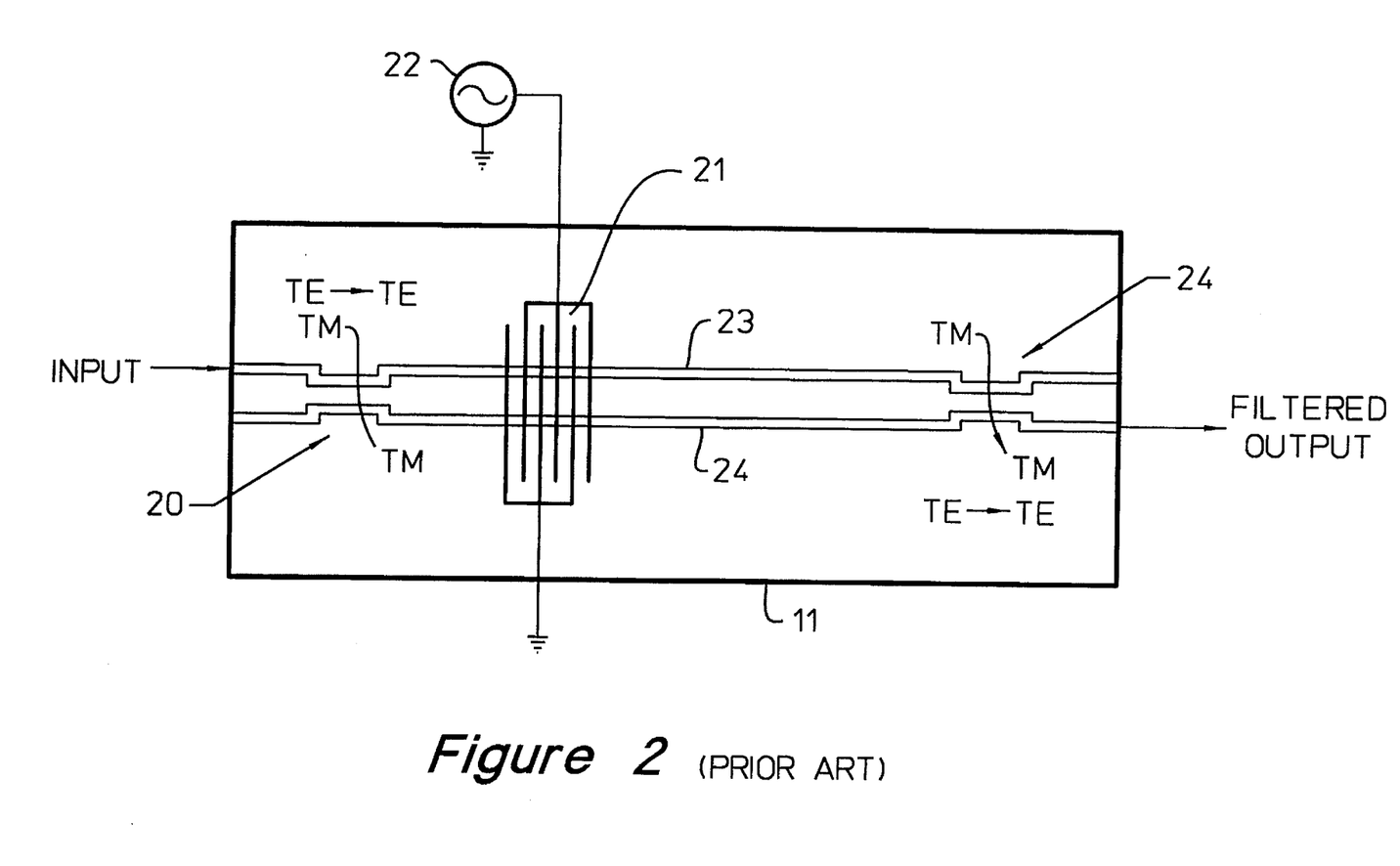
FIG. 2 shows a prior art attempt to fabricate a polarization independent integrated AOTF.

FIG. 2 shows a prior art attempt to fabricate a polarization independent AOTF on a single substrate. A first optical waveguide 23 and a second optical waveguide 24 are formed on the upper surface of the substrate. A light beam of arbitrary polarization is coupled into the first waveguide 23 and the second waveguide 24 through an input TE-TM splitter 20. The TE-TM splitter 20 separates the TE and TM components of the incoming beam of light. The TE component is coupled into the first waveguide 23 and the TM component is coupled into the second waveguide 24. A surface acoustic wave is induced in the waveguides 23, 24 by an interdigitated traducer 21.

Within the narrow band of the filter all light propagating in one polarization mode is converted to the orthogonal mode. The TE component of the first waveguide within the narrow band of the filter is converted to TM and the TM component of the second waveguide within the narrow band of the filter is converted to TE. An output TE-TM splitter 24 combines the TM components within the first waveguide and the TE components of the second waveguide. The combined signals are passed to the output of the AOTF.

The prior art tunable band-pass filter shown in FIG. 2 has very limited out-of-band rejection. The TE-TM splitters 20, 24 are very hard to manufacture on the same substrate as the waveguides 23, 24. As a result, the isolation between the TE component coupled into the first waveguide 23 and the TM component coupled into the second waveguide 24 is very poor. An ideal TE-TM splitter will not have significant coupling between splitter outputs. That is, the TE component output of the ideal TE-TM splitter will not have a significant TM component and the TM component output of the ideal TE-TM splitter will not have a significant TE component. The coupling between the splitter outputs significantly reduces the effectiveness of the out-of band rejection of the filter.

AOTF construction as has been described is limited because the input beam of light must be constrained to a single polarization in order to obtain useable filter performance. In some applications, it is desirable to be able to filter a beam of light without constraining the incident light to a single polarization. A single fiber may couple several optical signals each at a different wavelength and each having a unique polarity to a single AOTF. It would be useful to be able to tune the pass band of the AOTF to be centered on a single one of the optical signals. It would also be useful if the AOTF were able to filter each optical signal individually without requiring the optical signals to be of a particular polarization.

SUMMARY OF THE INVENTION

The present invention is an AOTF system that is polarization independent and which has filtering characteristics superior to those presently available. The invention includes several AOTF system configurations in which each configuration provides a unique set of characteristics.

A first embodiment of this invention is a polarization independent acousto-optical tunable filter which includes a first walk-off crystal receiving an incoming beam of randomly polarized light and separating the randomly polarized light into a first polarized light beam and a second polarized light beam in which the first light beam and the second light beam are orthogonal to each other and separated by a separation distance. This embodiment further includes a dual acousto-optical tunable filter. The dual acousto-optical tunable filter includes a base of acousto-optic material comprising a first waveguide and a second waveguide separated by the separation distance and adapted to receive the first light beam and the second light beam, a first transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band, and providing a first filtered light beam and a second filtered light beam. A first lens is placed between the first walk-off crystal and the dual acousto-optical tunable filter for focusing the first light beam and the second light beam before being received by the dual acousto-optical tunable filter. This embodiment further includes a second walk-off crystal receiving the first filtered light beam and the second filtered light beam from the dual acousto-optical tunable filter wherein light of the first filtered light beam and the second filtered light beam within the optical frequency band are combined at a second walk-off crystal output. Finally, a second lens is placed between the dual acousto-optical tunable filter and the second walk-off crystal for focusing the first filtered light beam and the second filtered light beam before being received by the second walk-off crystal.

A second embodiment of this invention further incorporates into the first embodiment a first TM polarizer in which a first half wavelength plate is attached to lower portion of the first TM polarizer and a first piece of optically transmissive material is attached to an upper portion of the first TM polarizer. The TM polarizer is attached adjacent to the first waveguide and the second waveguide wherein a TE component light beam transmitting from the first walk-off crystal passes through the first half wavelength plate and the TM polarizer before being received by the second waveguide and wherein a TM component light beam transmitting from the first walk-off crystal passes through the first piece of optically transmissive material and the TM polarizer before being received by the first waveguide. This embodiment further includes a second transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band. A TE polarizer is fabricated on the base and located between the first transducer and the second transducer. This embodiment further includes a second TM polarizer in which a second half wavelength plate is attached to an upper portion of the second TM polarizer and a second piece of optically transmissive material is attached to a lower portion of the second TM polarizer, the second TM polarizer being attached adjacent to the first waveguide and the second waveguide wherein a light beam transmitting from the second waveguide passes through the TM polarizer and the second optically transmissive piece before being received by the second walk-off crystal and wherein a light beam transmitting from the first waveguide passes through the TM polarizer and the second half wavelength plate before being received by the second walk-off crystal.

A third embodiment of this invention further incorporates into the first embodiment a first half wavelength plate attached adjacent to the second waveguide and a first piece of optically transmissive material attached adjacent to the first waveguide. A TE component light beam transmitting from the first walk-off crystal passes through the first half wavelength plate before being received by the second waveguide and a TM component light beam transmitting from the first walk-off crystal passes through the first piece of optically transmissive material before being received by the first waveguide. This embodiment further includes a second transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band. A TE polarizer is fabricated on the base and located between the first transducer and the second transducer. This embodiment further includes a second half wavelength plate attached adjacent to the first waveguide and a second piece of optically transmissive material attached adjacent to the second waveguide. A light beam transmitting from the second waveguide passes through the second optically transmissive piece before being received by the second walk-off crystal and a light beam transmitting from the first waveguide passes through the second half wavelength plate before being received by the second walk-off crystal.

A fourth embodiment of this invention further incorporates into the first embodiment a quarter wave plate adjacent to the second walk-off crystal output. This embodiment also includes a mirror for reflecting a light beam transmitting from the second walk-off crystal and passing through the quarter wavelength delay means back through the quarter wavelength delay means and back into the second walk-off crystal and a circulator located prior to the first walk-off crystal. The arrangement of the components being such that an incoming beam of light passes through the circulator, is separated into the first and second beams of light in the first walk-off crystal which are filtered by the dual acoustic tunable filter, recombined in the second walk-off crystal, phase shifted by the quarter wavelength delay means, reflected off of the mirror, phase shifted again by the quarter wavelength delay means, separated again into two beams of light by the second walk-off crystal which are filtered again by the dual acoustic tunable filter, recombined in the first walk-off crystal, received by the circulator and transmitted from a circulator output.

Another embodiment of this invention is a polarization independent acousto-optical tunable filter including a first walk-off crystal receiving an incoming beam of randomly polarized light and separating the randomly polarized light into a first polarized light beam and a second polarized light beam wherein the first light beam and the second light beam are orthogonal to each other and separated by a separation distance. This embodiment further includes a dual acousto-optical tunable filter. The dual acousto-optical tunable filter including a base of acousto-optic material comprising a first waveguide and a second waveguide separated by a separation distance and adapted to receive the first light beam and the second light beam, a first transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band. A first lens is placed between the first walk-off crystal and the dual acousto-optical tunable filter for focusing the first light beam and the second light beam before being received by the dual acousto-optical tunable filter. This embodiment includes a 45° Faraday rotator in which a first filtered light beam and a second filtered light beam from the dual acousto-optical tunable filter pass and are phase shifted by a quarter wavelength. A second lens placed between the dual acousto-optical tunable filter and the 45° Faraday rotator for focusing the first filtered light beam and the second filtered light beam before passing through the 45° Faraday rotator. This embodiment also includes a mirror for reflecting a light beam transmitting from the second walk-off crystal and passing through the 45° Faraday rotator back through the 45° Faraday rotator and back into the dual acousto-optical tunable filter in which again the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band. Finally, this embodiment includes the first walk-off crystal having a TM output and a TE output wherein TM and TE light beam components propagating back through the base and having a frequency within an optical frequency band are coupled.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in an AOTF system. Previous AOTF system dependency on the polarization of the incoming optical signal has been overcome. The AOTF system according to the invention provides better optical signal bandpass filtering performance than previously possible.

In accordance with the invention, filtering of an incoming optical signal is accomplished by separating the TM and TE components of the optical signal with a first walk-off crystal. The TM and TE components are filtered individually by passing the components down two separate waveguides that have been formed on a single substrate comprising at least one filter stage. The filtering converts the optical wavelengths of the TM component that are within the passband of the filter to TE and the optical wavelengths of the TE component that are within the passband of the filter to TM. The optical wavelengths of the optical components that are within the passband of the filter will hereafter be called in-band components. The TE and TM components are recombined by a second walk-off crystal. The filtering characteristics can be improved by passing the incoming optical signal through more than one stage of filtering.

Figure 3:
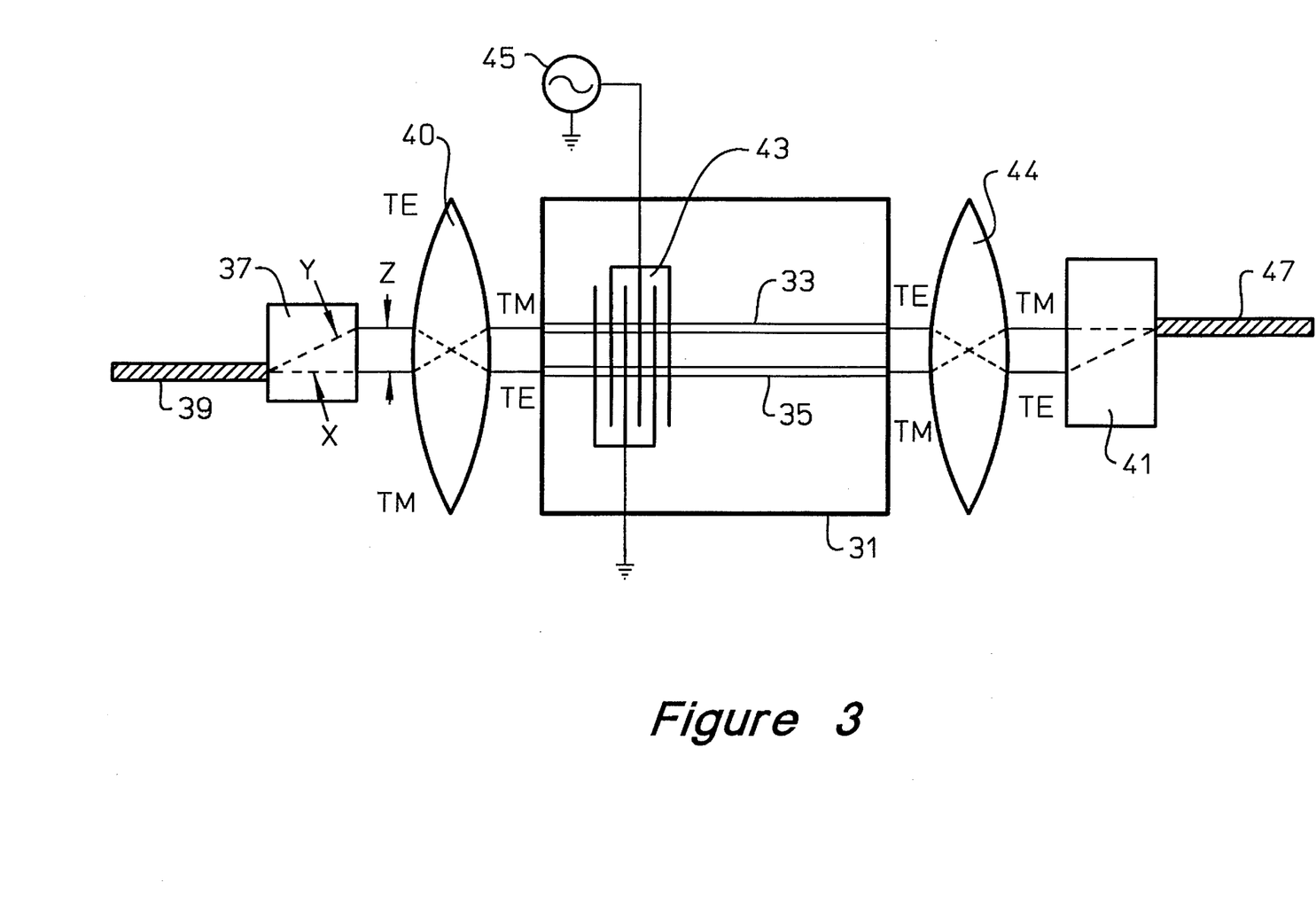
FIG. 3 shows an embodiment of the polarization independent AOTF system of this invention.

FIG. 3 shows an embodiment of this invention. An AOTF is fabricated in an elongated crystalline substrate 31 such as lithium niobate ($LiNbO_3$). A first optical waveguide 33 and a second optical waveguide 35 are formed in an upper surface of the substrate, for example by indiffusion of titanium.

A beam of light is coupled into a first walk-off crystal 37 through an input optical fiber 39. The first walk-off crystal 37 is oriented to pass the TM component X of the received beam of light straight through the first walk-off crystal 37 without deviating the direction of the light beam from the original direction of the received beam of light. The first walk-off crystal 37 is oriented to redirect the TE component Y of the received beam of light at an angle with respect to the direction of the received beam of light. Therefore, the first walk-off crystal 37 provides separate outputs for the TM component and the TE component of the received beam of light. The separation distance Z between the TM output and the TE output is controlled by the thickness of the first walk-off crystal 37.

A first optical lens 40 focuses the components of light to optimize the coupling of the components of light from the first walk-off crystal 37 to the first optical waveguide 33 and the second optical waveguide 35. The first optical lens 40 is a 1:1 reverse imaging lens. The TE component of light from the first walk-off crystal 37 is coupled into the second optical waveguide 35. The TM component of light from the first walk-off crystal 37 is coupled into the first optical waveguide 33. The TE and TM components of light propagate through the waveguides and are received by a second walk-off crystal 41.

A first surface acoustic wave is induced in the waveguides 33, 35 by a first interdigitated transducer 43. The first transducer 43 is driven by an externally-generated electrical signal 45. The frequency of the first acoustic wave is determined by the frequency of the electrical signal. The first acoustic wave induces a diffraction grating in the waveguides 33, 35, and this in turn diffracts the beams of light passing through each waveguide 33, 35. The grating couples the TE and TM polarization modes of light, but only within a narrow band of optical wavelengths. Thus, within this narrow band all light propagating in one polarization mode is converted to the orthogonal mode, whereas outside this band the polarization mode of the light is unaffected. The TM component of light will be converted to TE within the pass band and the TE component of light will be converted to TM within the pass band. The center frequency of the passband can be tuned by changing the frequency of the electrical signal that drives the first transducer 43.

The second walk-off crystal 41 receives the TE and TM components of light from the first optical waveguide 33 and the second optical waveguide 35, respectively. A second optical lens 44 focuses the components of light to optimize the coupling of the light components from the first optical waveguide 33 and the second optical waveguide 35 to the second walk-off crystal 41. The second optical lens 44 is a 1:1 reverse imaging lens. Within the narrow passband defined by the acoustic wave the polarization of the light beams passing through the first optical waveguide 33 and the second optical waveguide 35 are converted to the orthogonal mode. Therefore, within the defined passband the TM component of light that is received from the first walk-off crystal 37 is converted to TE before being received by the second walk-off crystal 41. Within the defined passband the TE component of light that is received from the first walk-off crystal 37 is converted to TM before being received by the second walk-off crystal 41. As a result of the polarization conversions, the TE and TM components of light within the defined passband will be recombined by the second walk-off crystal 41 to form a single output which is coupled to an output optical fiber 47.

Figure 4:
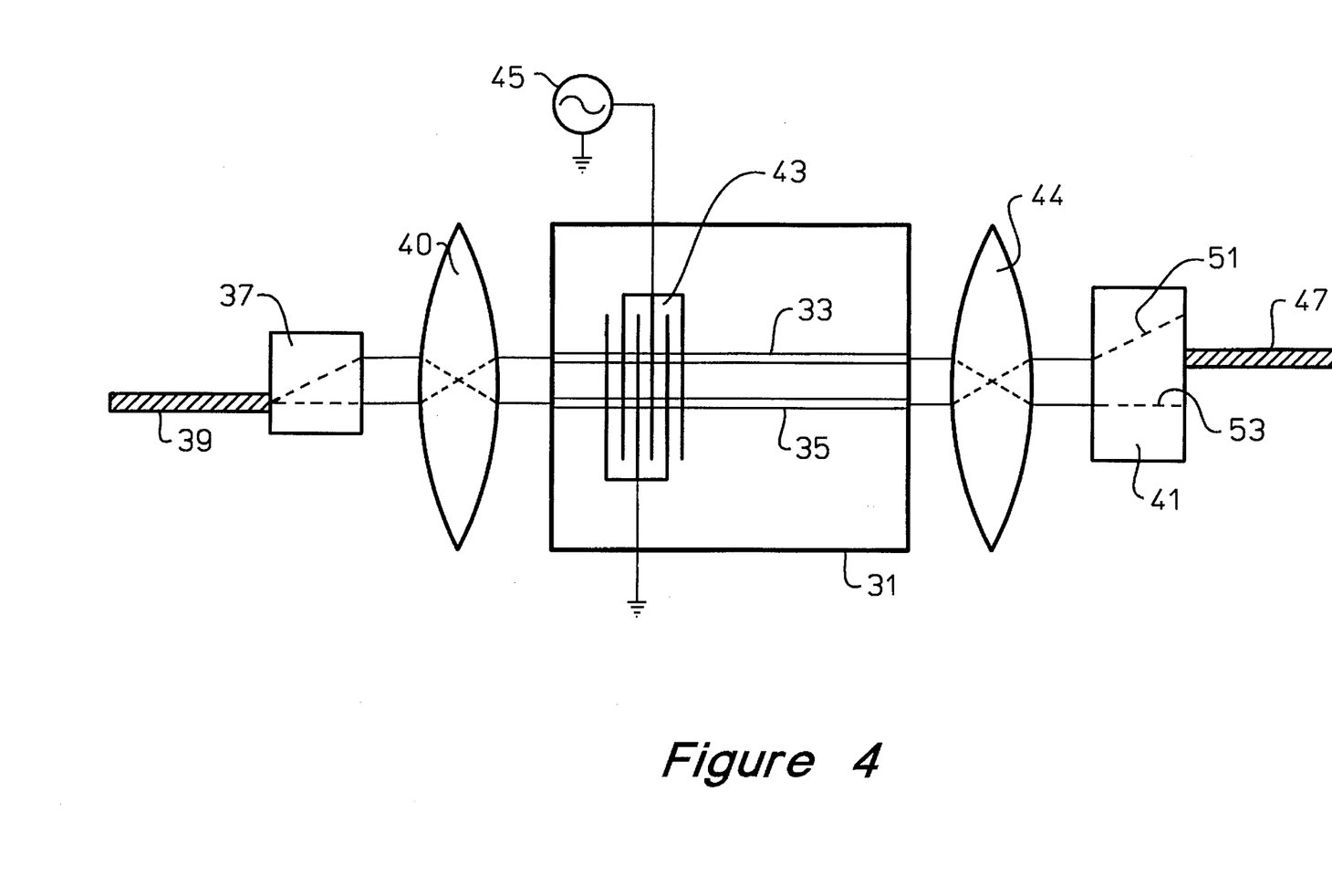
FIG. 4 shows the path traveled by the out-of-band components of light in the embodiment of FIG. 3.

FIG. 4 depicts the paths traveled by the TE and TM components of light that are outside the defined passband of the AOTF. The dashed lines 51, 53 within the second walk-off crystal 41 depict the paths of the out-of-band light components. The components of light outside of the defined passband of the AOTF are not converted to the orthogonal mode when passing down the waveguides 33, 35. The TM and TE components of light are diffracted in the same direction in the second walk-off crystal 41 as they were in the first walk-off crystal 37. Therefore, without the orthogonal conversion of the out-of-band light components the out-of-band light component are not coupled into the output optical fiber 47. Rather, the out-of-band light component are directed along the paths depicted by the dashed lines 51, 53.

If the electrical signal 45 is turned off, then the TM and TE components of the light beam are unaffected when traveling through the waveguides 33, 35. Therefore, no light is coupled to the output optical fiber 47 through the second walk-off crystal 41.

Figure 5:
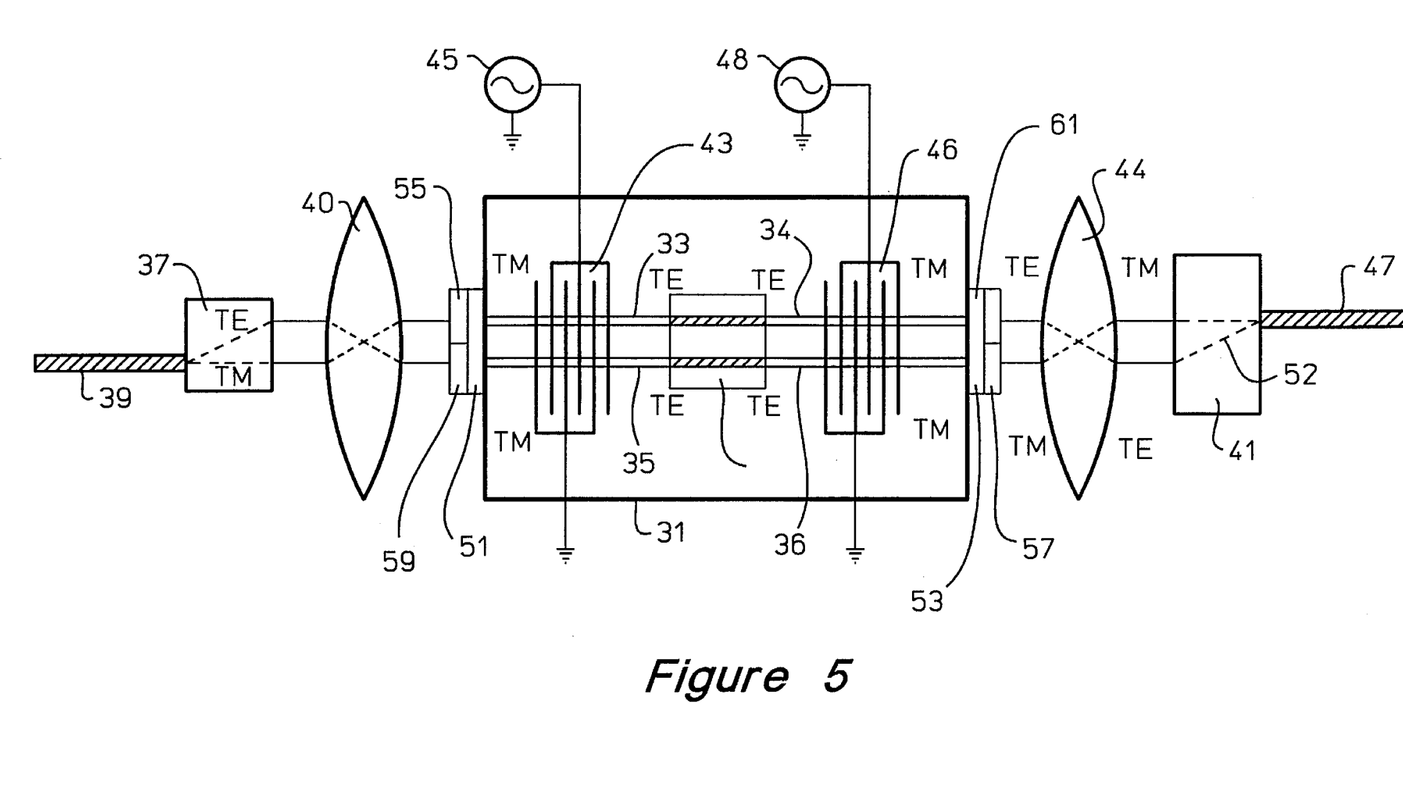
FIG. 5 shows another embodiment of this invention comprising two stages of filtering on a single AOTF substrate.

FIG. 5 depicts another embodiment of this invention. Several components have been added that greatly improve the performance of the polarization independent AOTF system. The configuration of this AOTF system includes a second stage of filtering that improves the out-of-band signal suppression. The second stage of filtering is included by inducing a second acoustic wave in the a third waveguide 34 and a fourth waveguide 36 with a second interdigitated transducer 46. The second transducer 46 is driven by an externally-generated electrical signal source 48. The frequency of the second acoustic wave is determined by the frequency of the second electrical signal. The second acoustic wave induces a diffraction grating in the waveguides 34, 36, and this in turn diffracts the beams of light passing through each waveguide 34, 36. The grating couples the TE and TM polarization modes of light, but only within a narrow band of optical wavelengths. Thus, within this narrow band all light propagating in one polarization mode is converted to the orthogonal mode, whereas outside this band the polarization mode of the light is unaffected.

The frequency of the beams of light are Doppler-shifted as the beams of light pass through the AOTF because the grating induced by the first acoustic wave is in motion with respect to the waveguide. If desired, the Doppler shift to the optical signals due to the first acoustic wave can be canceled by the second acoustic wave. Therefore, the filtered optical output will not be shifted in frequency.

The embodiment of the invention shown in FIG. 5 includes a first TM polarizer 51 and a second TM polarizer 53 which are attached to the two-stage AOTF with an optical epoxy. The TM polarizers are attached to the AOTF rather than fabricating them directly on the AOTF substrate because TM polarizers are much easier to manufacture as an individual component than to fabricate directly on an AOTF substrate. Component TM polarizers have better rejection of TE polarization signals than TM polarizers built directly on an AOTF substrate.

Attached to a lower section of the first TM polarizer 51 is a first half wave plate 59. The orientation of the first half wave plate 59 is set so that the incoming TE linear polarized light is converted to TM. Attached to an upper section of the second TM polarizer 53 is a second half wave plate 61. Attached to an upper section of the first TM polarizer 51 is a first piece of optically transmissive material 55 such as glass which maintains unity between the path length traveled by the two light components as determined by the first walk-off crystal 37. Attached to a lower section of the second TM polarizer 53 is a second piece of optically transmissive material 57 which also maintains unity between the path lengths traveled by the two light components.

Fabricated on the substrate 31 is a TE polarizer 63. TE polarizers are much easier to fabricate on an AOTF substrate than TM polarizers. A similar embodiment can be constructed incorporating a TM polarizer, but such an embodiment is much more difficult to construct. The optical components traveling down the first and second optical waveguides 33, 35 are coupled into the TE polarizer 63. The TE polarizer 63 passes TE optical components coupled from the first and second optical waveguides 33, 35 and substantially attenuates any other optical components. The outputs of the TE polarizer 63 are coupled into the third waveguide 34 and the fourth waveguide 36.

The theory of operation of the embodiment of FIG. 5 is as follows. The first walk-off crystal 37 receives an optical signal of an unspecified polarization from an input optical fiber 39 and separates the optical signal into TE and TM optical components. The TM optical component passes straight through the crystal whereas the TE optical component is redirected. The first walk-off crystal 37 separates the TE and TM optical components by a distance that is controlled by the thickness of the first walk-off crystal 37. The thickness of the crystal is selected so that the TE and TM components are transmitted from the walk-off crystal separated by a distance equal to the distance between the first waveguide and the second waveguide.

The TM and TE components of light pass through the first lens 40. Passing through the first lens 40 focuses the components of light to more optimally couple the components of light to the first and second waveguides 33, 35.

After passing though the first lens 40, the TE component of light passes through the first half wave plate 59 which is orientated to rotate the TE component to TM. Simultaneously, the original TM component passes without a polarization conversion through the first piece of optical material 55. Both components of light then pass through the first TM polarizer 51 which greatly attenuates any residual TE components still present in either of the TM optical signal components.

After passing through the first TM polarizer, both of the TM signals are coupled into the first and second waveguides 33, 35 and pass through the first acoustic wave induced by the first transducer 43. The frequency components of both of the TM optical signals within the pass-band of the AOTF are convened to TE. The out-of-band frequency components of both of the TM optical signals remain TM.

The two optical signals passed down the first and second waveguides 33, 35 are coupled into the TE polarizer 63. The TE polarizer 63 rejects the out-of-band TM frequency components of both optical signal. The in band TE components of both optical signal are allowed to pass.

The two TE optical signals passing through the TE polarizer 63 are coupled into the third and fourth waveguides 34, 36 and pass through the second acoustic wave induced by the second transducer 46. The frequency components of both of the TE optical signals within the pass-band of the AOTF are convened to TM. The out-of-band frequency components of both of the TE optical signals remain TE.

The two optical signals then pass through the second TM polarizer 53 which greatly attenuates the out-of-band TE components of both optical signals. The in band TM components of both optical signal are allowed to pass with minimal attenuation.

The TM component transmitting from the third waveguide 34 is convened to TE by passing the TM optical component through the second half wave plate 61. The TM optical component transmitting from the fourth waveguide 36 passes through the second piece of optical material 57.

Both optical components pass through a second optical lens 44. The second optical lens 44 focuses the optical components so that the optical components are more effectively coupled to the second walk-off crystal 41.

The TM component again passes directly through the second walk-off crystal whereas the TE optical component is redirected as depicted by the dashed line 52 in FIG. 5. The TM and TE component are recombined in the second walk-off crystal. The spacing between the first waveguide 33 and the second waveguide 35 determine the thickness of the second walk-off crystal 41. The optical signal transmitted from the second walk-off crystal represents the original optical signal having passed through two stages of band pass filtering. The optical signal transmitting from the second walk-off crystal is coupled into the output optical fiber 47.

Figure 6:
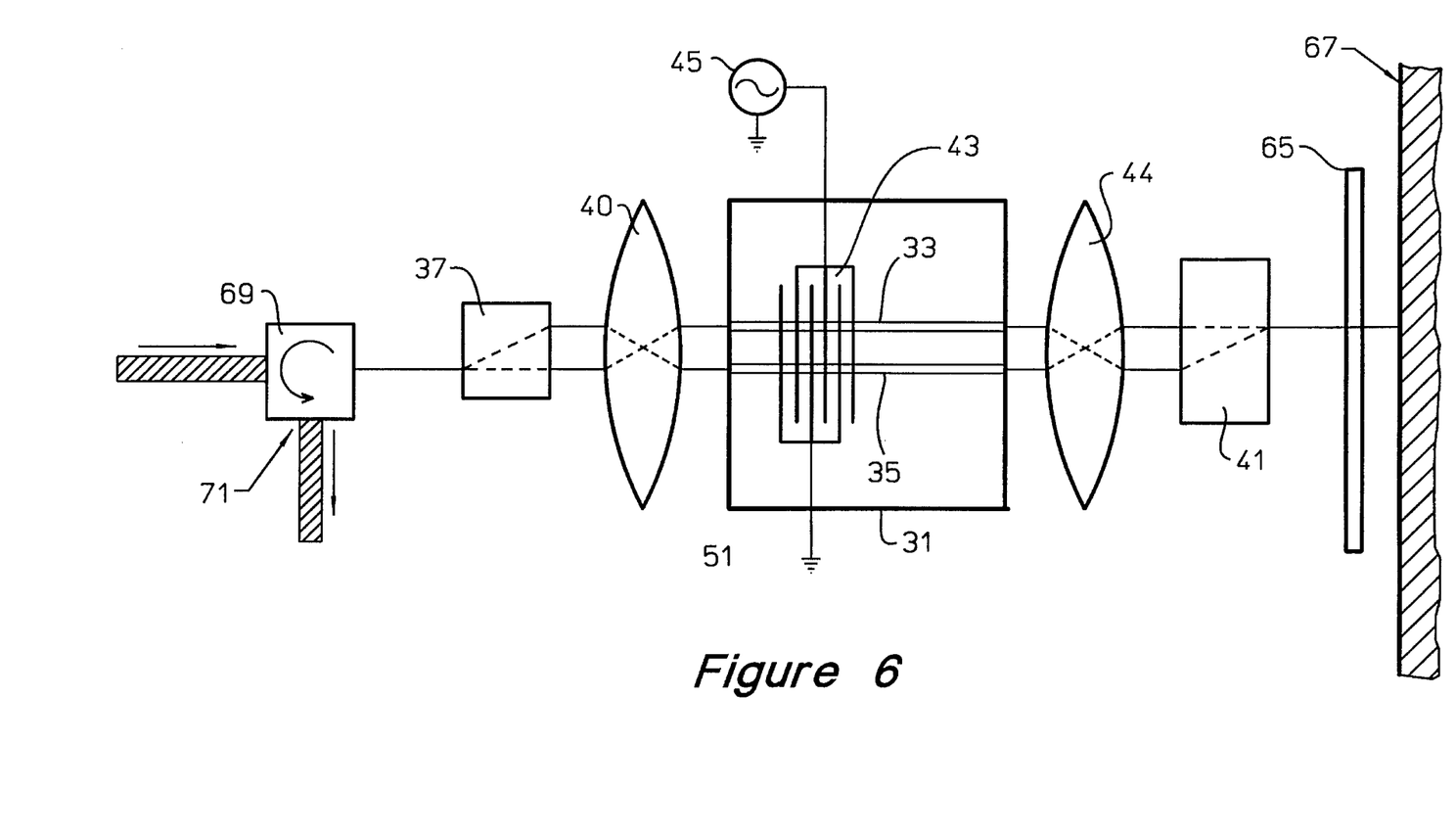
FIG. 6 shows another embodiment of this invention in which two stages of filtering are obtained by passing an incoming optical signal through the same AOTF twice.

FIG. 6 shows another embodiment of this invention. In this embodiment, two stages of signal filtering are realized whit only one transducer 43 on the substrate 31. Two stages of filtering are realized by passing the incoming beam of light through the AOTF a first time, reflecting the beam of light off of a mirror 67 and then passing the beam of light through the same AOTF a second time. A band pass filtered representation of the original beam of light is obtained at a circulator output 71 of an optical circulator 69 located at the input of the embodiment.

The incoming beam of light to be filtered is coupled through the circulator 69 and into the first walk-off crystal 37. The first walk-off crystal 37 separates the incoming beam of light into TE and TM optical signal components which are coupled into the first and second waveguides 33, 35. The frequency components of the TE and TM optical signals within the passband of the filter are each converted to the orthogonal mode.

A 45° Faraday rotator 65 and a mirror 67 are located at the output of the second walk-off crystal 41. For this embodiment, the 45° Faraday rotator 65 may be replaced with a quarter wavelength plate. The second walk-off crystal 41 combines the TM and TE optical signal components that are within the defined filter passband. The second walk-off crystal 41 does not combines the TM and TE optical signal components that are not within the defined filter passband. The combined optical signal transmitted from the second walk-off crystal passes through the 45° Faraday rotator 65, reflects off of the mirror 67 and passes back through the 45° Faraday rotator 65 a second time. The TM and TE optical signal components experience a quarter wavelength phase shift upon passing through the 45° Faraday rotator 65. The two quarter wavelength phase shifts of the optical components converts the TM component to TE and converts the TE component to TM.

The reflected optical signal is separated into orthogonal TE and TM optical signal components upon passing back through the second walk-off crystal 41. The TE and TM optical signal components are coupled back into and travel back down the first and second waveguides 33, 35. The frequency components of the optical signal within the pass band of the AOTF are once again converted to the orthogonal mode. The first walk-off crystal 37 combines the frequency components of the TE and TM optical components that are within the filter pass band. The frequency components that are outside of the filter pass band are not combined within the first walk-off crystal.

The combined filtered optical components are coupled back into the circulator 69. A circulator output 71 provides access to the filtered optical signal comprising the combined filtered optical components.

The configuration of this embodiment causes the optical component that initially passes down the first waveguide 33 to pass down the second waveguide 35 after being reflected off the mirror 67. The optical component that initially passes down the second waveguide 35 passes down the first waveguide 33 after the optical component has been reflected off of the mirror 67. The result is that the Doppler frequency shift to the optical component during the first pass through the AOTF is canceled during the second pass. Therefore, this configuration has the added benefit that the filtered output is not frequency shifted from the original optical signal frequency.

Figure 7:
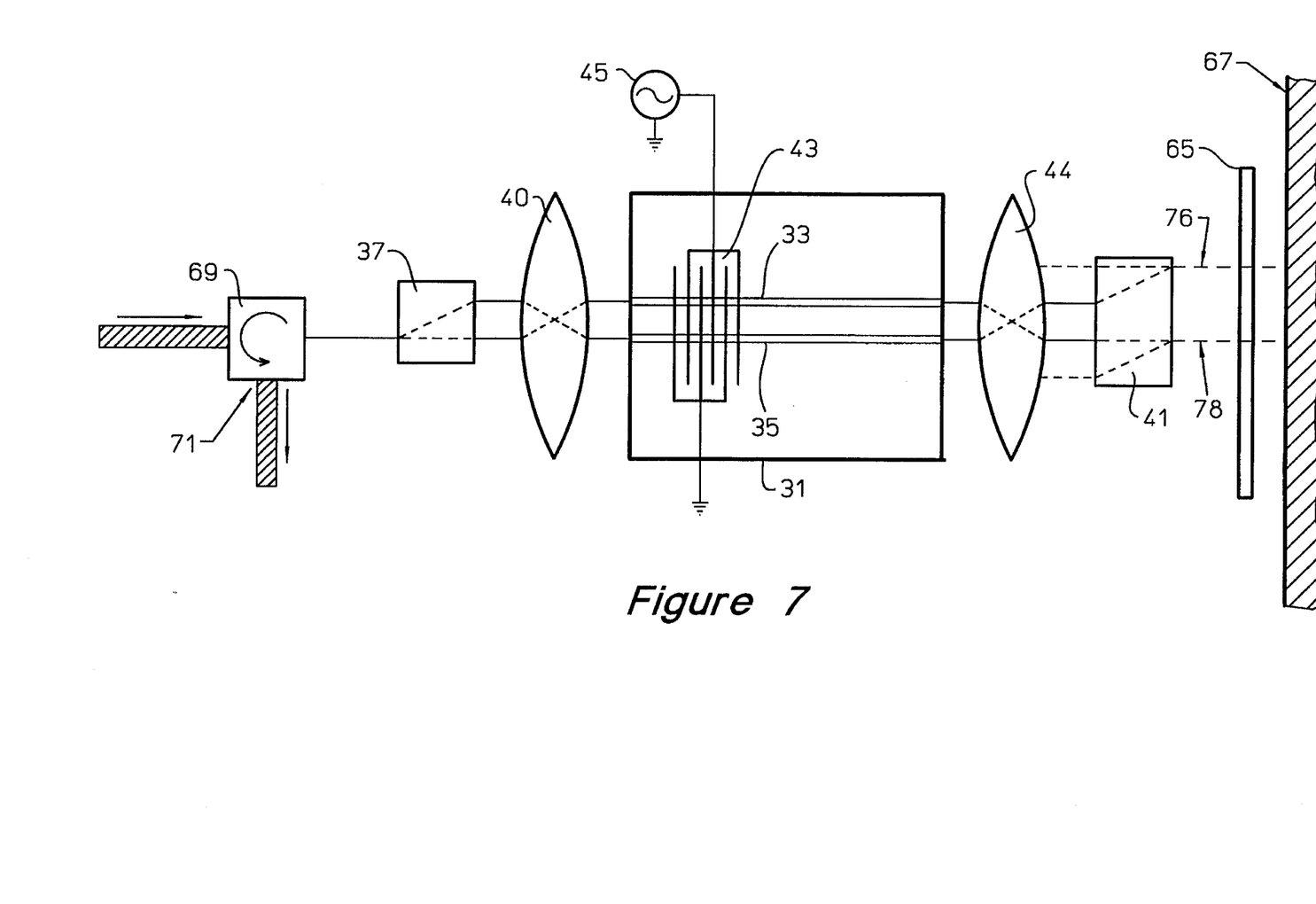
FIG. 7 shows the path traveled by the out-of-band components of light in the embodiment of FIG. 6.

The second walk-off-crystal 41 of this embodiment attenuates the out-of-band frequency components of the optical components. The dashed lines 76, 78 in FIG. 7 depict the paths of the out-of-band optical components. The second walk-off-crystal directs the out-of-band frequency components so that the out-of-band frequency components do not combine and are not coupled back into the AOTF after reflecting from the mirror 67. Therefore, the second walk-off-crystal provides filtering of the original optical signal.

Figure 8:
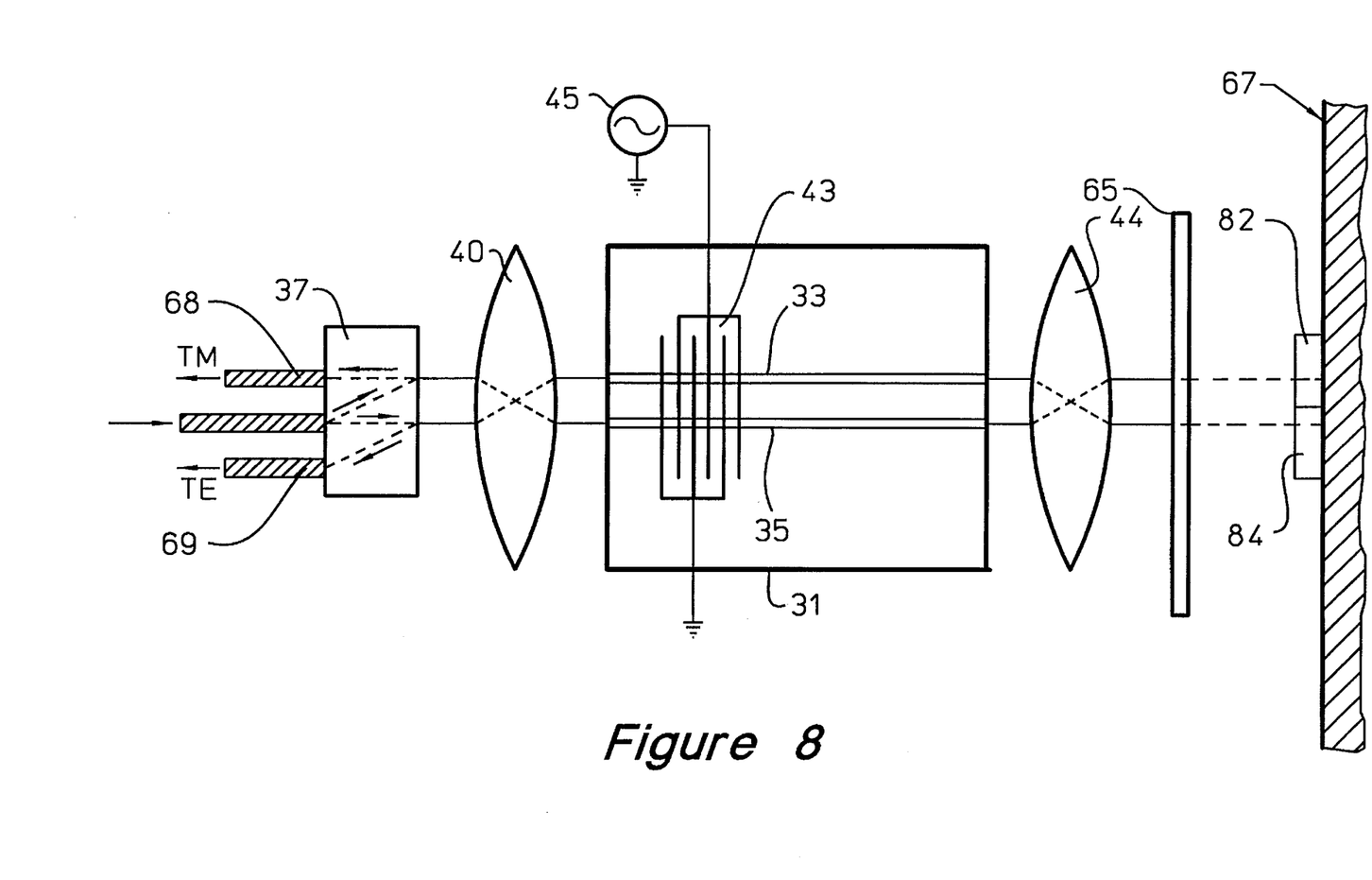
FIG. 8 shows another embodiment of this invention in which two stages of filtering are obtained by passing an incoming optical signal through the same AOTF twice.

FIG. 8 shows another embodiment of this invention. As in the previous embodiment, two stages of signal filtering are obtained with only one transducer 43 fabricated on the substrate 31. This embodiment does not, however, require the second walk-off crystal 41 or the circulator 69.

An incoming beam of light is once again coupled into a first walk-off crystal 37. The walk-off crystal 37 separates the incoming beam of light into TE and TM optical components. The TE and TM components of light are coupled into the first and second waveguides 33, 35. The TE and TM optical signal components travel down the first and second waveguides 33, 35 and the frequency components of the TE and TM optical components within the passband are converted to the orthogonal mode. The in-band TE optical signal component transmitting from the first waveguide passes through the second optical lens 44, the 45° Faraday rotator 65, a TE plus 45° polarizer 84, reflects off the mirror 67, and travel back through the TE plus 45° polarizer 84, the 45° Faraday rotator 65 and the second optical lens 44. The in-band TM optical signal component transmitting from the first waveguide passes through the second optical lens 44, the 45° Faraday rotator 65, a TM plus 45° polarizer 82, reflects off the mirror 67, and travel back through the TM plus 45° polarizer 82, the 45° Faraday rotator 65 and the second optical lens 44. The TM plus 45° polarizer 84 and the TE plus 45° polarizer 82 provide attenuation of out-of-band frequency components of the optical signals.

The optical components are converted to the orthogonal mode upon passing through the 45° Faraday rotator 65 twice. The first waveguide 33 receives the reflected TM optical component and the second waveguide 35 receives the reflected TE optical component. The components of light are passed back through the first and second waveguides 33, 35 and the polarization of the light beams are converted to the orthogonal mode within the narrow passband defined by the acoustic wave. The components of light transmit from the first and second waveguides 33, 35 and pass back through the first lens 40. The first lens 40 focuses the components of light to enhance the coupling of the components of light back into the first walk-off crystal 37.

The first walk-off crystal 37 of this embodiment has a TM output 68 and a TE output 69. The TM component of the twice filtered reflected beam of light passes straight through the first walk-off crystal and is coupled to the TM output 68. The TE component of the twice filtered reflected beam of light is directed diagonally through the first walk-off crystal and is coupled to the TE output 69.

Although specific embodiments of the invention have been described and illustrated, the invention is not to be limited to the specific forms or arrangements of parts so described and illustrated. The invention is limited only by the claims.

We claim:

1. A polarization independent acousto-optical tunable filter comprising:

a first walk-off crystal receiving an incoming beam of randomly polarized light and separating the randomly polarized light into a first polarized light beam and a second polarized light beam wherein the first light beam and the second light beam are orthogonal to each other and separated by a separation distance;

a dual acousto-optical tunable filter, the dual acousto-optical tunable filter comprising a base of acousto-optic material comprising a first waveguide and a second waveguide separated by the separation distance and adapted to receive the first light beam and the second light beam, a first transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band, and providing a first filtered light beam and a second filtered light beam;

a first lens placed between the first walk-off crystal and the dual acousto-optical tunable filter for focusing the first light beam and the second light beam before being received by the dual acousto-optical tunable filter;

a second walk-off crystal receiving the first filtered light beam and the second filtered light beam from the dual acousto-optical tunable filter wherein light of the first filtered light beam and the second filtered light beam within the optical frequency band are combined at a second walk-off crystal output; and a second lens placed between the dual acousto-optical tunable filter and the second walk-off crystal for focusing the first filtered light beam and the second filtered light beam before being received by the second walk-off crystal.

2. A polarization independent acousto-optical tunable filter as recited in claim 1, wherein the dual optical tunable filter further comprises:

a first TM polarizer;

a first half wavelength plate attached to lower portion of the first TM polarizer and a first piece of optically transmissive material attached to an upper portion of the first TM polarizer, the first TM polarizer being attached adjacent to the first waveguide and the second waveguide wherein a TE component light beam transmitting from the first walk-off crystal passes through the first half wavelength plate and the first TM polarizer before being received by the second waveguide and wherein a TM component light beam transmitting from the first walk-off crystal passes through the first piece of optically transmissive material and the first TM polarizer before being received by the first waveguide;

a second transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band;

a TE polarizer fabricated on the base and located between the first transducer and the second transducer;

a second TM polarizer; and a second half wavelength plate attached to an upper portion of the second TM polarizer and a second piece of optically transmissive material attached to a lower portion of the second TM polarizer, the second TM polarizer being attached adjacent to the first waveguide and the second waveguide wherein a light beam transmitting from the first waveguide passes through the second TM polarizer and the second piece of optically transmissive material before being received by the second walk-off crystal and wherein a light beam transmitting from the second waveguide passes through the second TM polarizer and the second half wavelength plate before being received by the second walk-off crystal.

3. A polarization independent acousto-optical tunable filter as recited in claim 1, wherein the dual optical tunable filter further comprises:

a first half wavelength plate attached adjacent to the second waveguide and a first piece of optically transmissive material attached adjacent to the first waveguide wherein a TE component light beam transmitting from the first walk-off crystal passes through the first half wavelength plate before being received by the second waveguide and wherein a TM component light beam transmitting from the first walk-off crystal passes through the first piece of optically transmissive material before being received by the first waveguide;

a second transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band;

a TE polarizer fabricated on the base and located between the first transducer and the second transducer;

a second half wavelength plate attached adjacent to the first waveguide and a second piece of optically transmissive material attached adjacent to the second waveguide wherein a light beam transmitting from the second waveguide passes through the second piece of optically transmissive material before being received by the second walk-off crystal and wherein a light beam transmitting from the first waveguide passes through the second half wavelength plate before being received by the second walk-off crystal.

4. A polarization independent acousto-optical tunable filter as recited in claim 1, further comprising:

quarter wavelength delay means adjacent to the second walk-off crystal output;

a mirror for reflecting a light beam transmitting from the second walk-off crystal and passing through the quarter wavelength delay means back through the quarter wavelength delay means and back into the second walk-off crystal; and a circulator located prior to the first walk-off crystal;

the arrangement of the components being such that an incoming beam of light passes through the circulator, is separated into the first and second beams of light in the first walk-off crystal which are filtered by the dual acoustic tunable filter, recombined in the second walk-off crystal, phase shifted by the quarter wavelength delay means, reflected off of the mirror, phase shifted again by the quarter wavelength delay means, separated again into two beams of light by the second walk-off crystal which are filtered again by the dual acoustic tunable filter, recombined in the first walk-off crystal, received by the circulator and transmitted from a circulator output.

5. A polarization independent acousto-optical tunable filter as recited in claim 4, wherein the quarter wavelength delay means comprises a quarter wave plate.

6. A polarization independent acousto-optical tunable filter as recited in claim 4, wherein the quarter wavelength delay means comprises a 45° Faraday rotator.

7. A polarization independent acousto-optical tunable filter comprising:

a first walk-off crystal receiving an incoming beam of randomly polarized light and separating the randomly polarized light into a first polarized light beam and a second polarized light beam wherein the first light beam and the second light beam are orthogonal to each other and separated by a separation distance;

a dual acousto-optical tunable filter, the dual acousto-optical tunable filter comprising a base of acousto-optic material comprising a first waveguide and a second waveguide separated by a separation distance and adapted to receive the first light beam and the second light beam, a first transducer responsive to an electrical signal to induce an acoustic wave in the base, the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band, and providing a first filtered light beam and a second filtered light beam;

a first lens placed between the first walk-off crystal and the dual acousto-optical tunable filter for focusing the first light beam and the second light beam before being received by the dual acousto-optical tunable filter;

a 45° Faraday rotator in which the first filtered light beam and the second filtered light beam from the dual acousto-optical tunable filter pass and are phase shifted by a quarter wavelength;

a second lens placed between the dual acousto-optical tunable filter and the 45° Faraday rotator for focusing the first filtered light beam and the second filtered light beam before passing through the 45° Faraday rotator;

a mirror for reflecting a light beam transmitting from the dual acousto-optical tunable filter and passing through the 45° Faraday rotator back through the 45° Faraday rotator and back into the dual acousto-optical tunable filter wherein again the acoustic wave operable to change the polarization mode of any light propagating through the base and having a frequency within an optical frequency band defined by the frequency of the acoustic wave and the optical properties of the base but not to change the polarization mode of any light having a frequency outside the optical frequency band; and the first walk-off crystal having a TM output and a TE output wherein TM and TE light beam components propagating back through the base and having a frequency within an optical frequency band are coupled.

* * * * *